US012544853B2

(12) United States Patent
Ghosh et al.

(10) Patent No.: US 12,544,853 B2
(45) Date of Patent: Feb. 10, 2026

(54) FRICTION STIR WELDING TOOL ASSEMBLY

(71) Applicant: Element Six (UK) Limited, Oxfordshire (GB)

(72) Inventors: Santonu Ghosh, Oxfordshire (GB); Branislav Dzepina, Oxfordshire (GB)

(73) Assignee: Element Six (UK) Limited, Oxfordshire (GB)

( * ) Notice: Subject to any disclaimer, the term of this patent is extended or adjusted under 35 U.S.C. 154(b) by 0 days.

(21) Appl. No.: 18/252,134

(22) PCT Filed: Nov. 29, 2021

(86) PCT No.: PCT/EP2021/083358
§ 371 (c)(1),
(2) Date: May 8, 2023

(87) PCT Pub. No.: WO2022/122447
PCT Pub. Date: Jun. 16, 2022

(65) Prior Publication Data
US 2024/0009756 A1 Jan. 11, 2024

(30) Foreign Application Priority Data

Dec. 11, 2020 (GB) .................................... 2019612

(51) Int. Cl.
*B23K 20/12* (2006.01)
*B23K 20/26* (2006.01)
(52) U.S. Cl.
CPC .......... *B23K 20/1255* (2013.01); *B23K 20/26* (2013.01)

(58) Field of Classification Search
CPC .. B23K 20/1255; B23K 20/26; B23K 20/125; B23K 2103/05; B23K 20/122–128
USPC ................................................ 228/112.1, 2.1
See application file for complete search history.

(56) References Cited

U.S. PATENT DOCUMENTS

| 6,051,079 A * | 4/2000 | Andersson ............ G06F 3/1293 148/318 |
| 12,246,390 B2 * | 3/2025 | Ghosh ................ B23K 20/1255 |
| 2004/0155096 A1 | 8/2004 | Zimmerman et al. |
| 2004/0256442 A1 * | 12/2004 | Gates, Jr. .............. B23B 27/148 228/141.1 |
| 2005/0249978 A1 | 11/2005 | Yao |
| 2010/0038832 A1 * | 2/2010 | Rosal ................. B23K 20/1255 228/2.1 |

(Continued)

FOREIGN PATENT DOCUMENTS

| CA | 2861618 A1 * | 7/2013 | ......... B23K 20/1265 |
| CA | 3155030 A1 * | 6/2021 | ............... B22F 3/14 |

(Continued)

OTHER PUBLICATIONS

PALLABRAZE—filler metals Johnson Matthey (Wayback Machine Oct. 6, 2022).*

(Continued)

*Primary Examiner* — Kiley S Stoner
(74) *Attorney, Agent, or Firm* — Armstrong Teasdale LLP

(57) ABSTRACT

This disclosure relates to a friction stir welding (FSW) tool assembly comprising a bonding layer to bond the tool insert and the tool holder together, wherein the bonding layer is a layer of braze with a melting temperature of at least 900° C.

12 Claims, 17 Drawing Sheets

(56) References Cited

U.S. PATENT DOCUMENTS

| | | | |
|---|---|---|---|
| 2011/0274943 A1* | 11/2011 | Fujii | B23K 20/1255 228/2.1 |
| 2012/0080506 A1* | 4/2012 | Matsunaga | B23K 20/1245 228/2.1 |
| 2013/0068825 A1* | 3/2013 | Rosal | B23K 20/1215 228/2.1 |
| 2014/0356215 A1 | 12/2014 | Yamazaki et al. | |
| 2016/0199934 A1* | 7/2016 | Maruko | B23K 20/1255 228/2.3 |
| 2018/0021882 A1* | 1/2018 | Yamamoto | B23K 20/1255 228/2.1 |
| 2021/0008658 A1* | 1/2021 | Frank | B23K 20/00 |
| 2021/0121977 A1* | 4/2021 | Rosal | B23K 20/1255 |
| 2021/0402503 A1* | 12/2021 | Zhao | B23K 20/123 |
| 2023/0311240 A1* | 10/2023 | Ghosh | B23K 20/1255 228/2.1 |
| 2024/0001478 A1* | 1/2024 | Seo | B23K 20/1255 |
| 2024/0009755 A1* | 1/2024 | Ghosh | B23K 20/1255 |
| 2024/0100625 A1* | 3/2024 | Ghosh | C22C 19/058 |

FOREIGN PATENT DOCUMENTS

| | | | | |
|---|---|---|---|---|
| CN | 1805820 A | * | 7/2006 | B23B 27/065 |
| CN | 1805821 A | * | 7/2006 | B23B 27/148 |
| CN | 201102126 Y | * | 8/2008 | |
| CN | 101618483 A | | 1/2010 | |
| CN | 101791747 A | * | 8/2010 | |
| CN | 201613422 A | | 10/2010 | |
| CN | 201613422 U | * | 10/2010 | |
| CN | 102019502 A | * | 4/2011 | B23K 20/1245 |
| CN | 102107328 A | * | 6/2011 | |
| CN | 102264501 A | * | 11/2011 | B23K 20/1255 |
| CN | 102107328 B | * | 3/2013 | |
| CN | 103934584 A | * | 7/2014 | B23K 1/00 |
| CN | 104551379 A | * | 4/2015 | |
| CN | 105234554 A | * | 1/2016 | B22F 3/105 |
| CN | 105579182 A | * | 5/2016 | B23K 20/1255 |
| CN | 105750725 A | * | 7/2016 | B23C 5/26 |
| CN | 105855693 A | * | 8/2016 | |
| CN | 106001897 A | * | 10/2016 | B23K 20/1255 |
| CN | 106001907 A | * | 10/2016 | |
| CN | 106735856 A | * | 5/2017 | B23K 20/1245 |
| CN | 105033447 B | * | 8/2017 | |
| CN | 104972219 B | * | 9/2017 | |
| CN | 107378167 A | * | 11/2017 | B23K 1/008 |
| CN | 108202181 A | * | 6/2018 | B23K 20/12 |
| CN | 110497117 A | * | 11/2019 | B23K 20/12 |
| CN | 111092030 A | * | 5/2020 | B23K 20/122 |
| CN | 111098016 A | * | 5/2020 | B23K 20/122 |
| CN | 111761198 A | * | 10/2020 | B23K 20/1245 |
| CN | 111922505 A | * | 11/2020 | B23K 20/122 |
| CN | 112091405 A | * | 12/2020 | B23K 20/1245 |
| CN | 112091406 A | * | 12/2020 | B23K 20/1245 |
| CN | 112091407 A | * | 12/2020 | B23K 20/125 |
| CN | 112091408 A | * | 12/2020 | B23K 20/12 |
| CN | 112122768 A | * | 12/2020 | B23K 20/122 |
| CN | 112247340 A | * | 1/2021 | |
| CN | 112355463 A | * | 2/2021 | |
| CN | 112935517 A | * | 6/2021 | B23K 20/1255 |
| CN | 113172331 A | * | 7/2021 | B23K 20/122 |
| CN | 113305415 A | * | 8/2021 | B23K 20/1255 |
| CN | 114734160 A | * | 7/2022 | B23K 1/02 |
| GB | 2579915 A | | 7/2000 | |
| GB | 2590551 A | * | 6/2021 | B22F 3/14 |
| JP | 02142043 A | | 5/1990 | |
| JP | 10244363 A | | 9/1998 | |
| JP | 2005199281 A | * | 7/2005 | |
| JP | 2009159694 A | * | 7/2009 | |
| KR | 20100116985 A | * | 11/2010 | |
| KR | 101816050 B1 | | 1/2018 | |
| KR | 101987064 B1 | | 6/2019 | |
| RU | 2646300 C2 | * | 3/2018 | |
| WO | WO-03035320 A1 | * | 5/2003 | B23K 20/12 |
| WO | 2007140043 A2 | | 12/2006 | |
| WO | WO-2010074165 A1 | * | 7/2010 | B23K 20/12 |
| WO | WO-2015064012 A1 | * | 5/2015 | B23K 20/2336 |
| WO | WO-2016111336 A1 | * | 7/2016 | B23K 20/122 |
| WO | WO-2019213474 A1 | * | 11/2019 | B22F 3/02 |
| WO | 2020155192 A1 | | 6/2020 | |
| WO | WO-2020115192 A1 | * | 6/2020 | B23K 20/1255 |
| WO | WO-2021123398 A1 | * | 6/2021 | B23K 20/1255 |
| WO | WO-2022049113 A1 | * | 3/2022 | B23K 20/122 |
| WO | WO-2022122446 A1 | * | 6/2022 | B23K 20/122 |
| WO | WO-2022122447 A1 | * | 6/2022 | B23K 20/122 |
| WO | WO-2022122639 A1 | * | 6/2022 | B23K 20/122 |
| WO | WO-2022200585 A1 | * | 9/2022 | B23K 20/1255 |
| WO | WO-2022200604 A1 | * | 9/2022 | B23K 20/1255 |

OTHER PUBLICATIONS

Combined Search and Examination Report issued for GB2019612.7, dated May 25, 2021 (8 pages).

Combined Search and Examination Report issued for GB2117179.8, dated May 20, 2022 (6 pages).

International Search Report and Written Opinion issued for PCT/EP2021/083358, dated Mar. 30, 2022 (12 pages).

* cited by examiner

Section Y-Y

FRICTION STIR WELDING TOOL ASSEMBLY

CROSS-REFERENCE TO RELATED APPLICATIONS

This application is the § 371 national stage of International Application No. PCT/EP2021/083358, filed Nov. 29, 2021, which claims priority to Great Britain Application No. 2019612.7, filed Dec. 11, 2020.

FIELD OF THE INVENTION

This disclosure relates to a friction stir welding (FSW) tool assembly comprising a tool insert and a tool holder. In particular, it relates to a FSW tool assembly for friction stir welding high temperature ferrous alloys and other high temperature alloys. More particularly, it relates to a FSW tool assembly in which the tool insert comprises polycrystalline cubic boron nitride (PCBN) or tungsten rhenium (W—Re).

BACKGROUND

FSW is a technique whereby a rotating tool is brought into forcible contact with two adjacent workpieces to be joined and the rotation of the tool creates frictional and viscous heating of the workpieces. Extensive deformation as mixing occurs along a plastic zone. Upon cooling of the plastic zone, the workpieces are joined along a welding joint. Since the workpiece remains in the solid phase, this process is technically a forging process rather than a welding process, none the less by convention, it is referred to as welding or friction stir welding and that convention is followed here.

In the case of FSW in low temperature metals, the whole tool/tool holder can be a single piece of shaped tool steel, in which case it is often referred to as a 'probe'. In the case here where the tool is for welding higher temperature alloys such as steel, the tool is often in two or more parts, with an end element that is in direct contact with the material being welded, often referred to as a 'puck' or 'tool insert', and the remainder of the tool being the 'tool holder' which holds the puck securely and which fits into the FSW machine, so that the tool puck and tool holder together make up the 'tool' or 'tool assembly'. The tool puck is typically shaped to form a shoulder and a stirring pin, often with a reverse spiral cut into the surface so that during rotation it pulls metal towards the pin and pushes this down into the hole being formed by the pin.

In general, FSW operations comprise a number of steps, for example:
a) an insertion step (also known as the plunge step), from the point when the tool comes into contact with the workpieces to the point where the pin is fully embedded up to the shoulder in the heated and softened workpieces,
b) a tool traverse, when the tool moves laterally along the line in between the workpieces to be joined, and
c) an extraction step, when the tool is lifted or traversed out of the workpieces.

The tool traverse, which is the stage primarily forming the weld, is usually performed under constant conditions; typically these conditions are rotational speed, conditions of the plunge, speed of traverse etc.

PCBN based tools are capable of withstanding the harsh FSW operating environment, where temperatures reach in excess of 1100° C. Tool pucks made from PCBN are relatively cost effective and highly durable. However, a limitation of the manufacturing process of PCBN pucks is that a bulk PCBN piece is required, out of which the puck is fashioned. Monolithic PCBN blocks need to be as high as 50 mm in diameter and 50 mm in height, in order to produce a puck with a 12 mm pin height, which will be capable of welding a 12 mm plate thickness. Monolithic PCBN blocks (and therefore PCBN pucks) larger than this are currently not feasible due to the limitations of the High Pressure High Temperature (HPHT) presses used during the PCBN sintering process. A larger press may compromise the material homogeneity. In short, the size of a PCBN puck currently achievable in practice is limited to being capable of welding plates with thickness 12 mm or below.

There is a real push to develop PCBN tools and accompanying tool holders that are capable of welding ferrous plates with a thickness above 12 mm.

A key challenge faced with large PCBN tools is retaining the tool within the tool holder, particularly during the insertion and traverse stages. Separation occasionally occurs, believed to be caused by the mismatch in the coefficient of thermal conductivity between the PCBN tool insert and the typically steel tool holder. Due to the extreme conditions of the FSW process, traditional methods such as screws will not work. The problem handicaps the performance of PCBN tool inserts, limiting the weld length that is otherwise potentially obtainable.

There is a need for a FSW tool assembly for welding higher temperature alloys that retains the tool insert within the tool holder during prolonged use.

SUMMARY OF THE INVENTION

According to the invention, there is provided a friction stir welding (FSW) tool assembly having a longitudinal axis of rotation about which it rotates during use, the tool assembly comprising a tool insert and a tool holder to coaxially hold the tool insert, the tool holder comprising a recessed cup into which the tool insert is at least partially received, the tool assembly further comprising a bonding layer to bond the tool insert and the tool holder together, wherein the bonding layer is a layer of braze with a melting temperature of at least 900° C. provided in the recessed cup.

Preferable and/or optional features of the invention are provided in the dependent claims.

BRIEF DESCRIPTION OF THE DRAWINGS

The invention will now be more particularly described, by way of example only, with reference to the accompanying drawings, in which.

Throughout the embodiments, similar parts are denoted by the same reference numeral and a further description is omitted for brevity.

DETAILED DESCRIPTION

Figure 1:
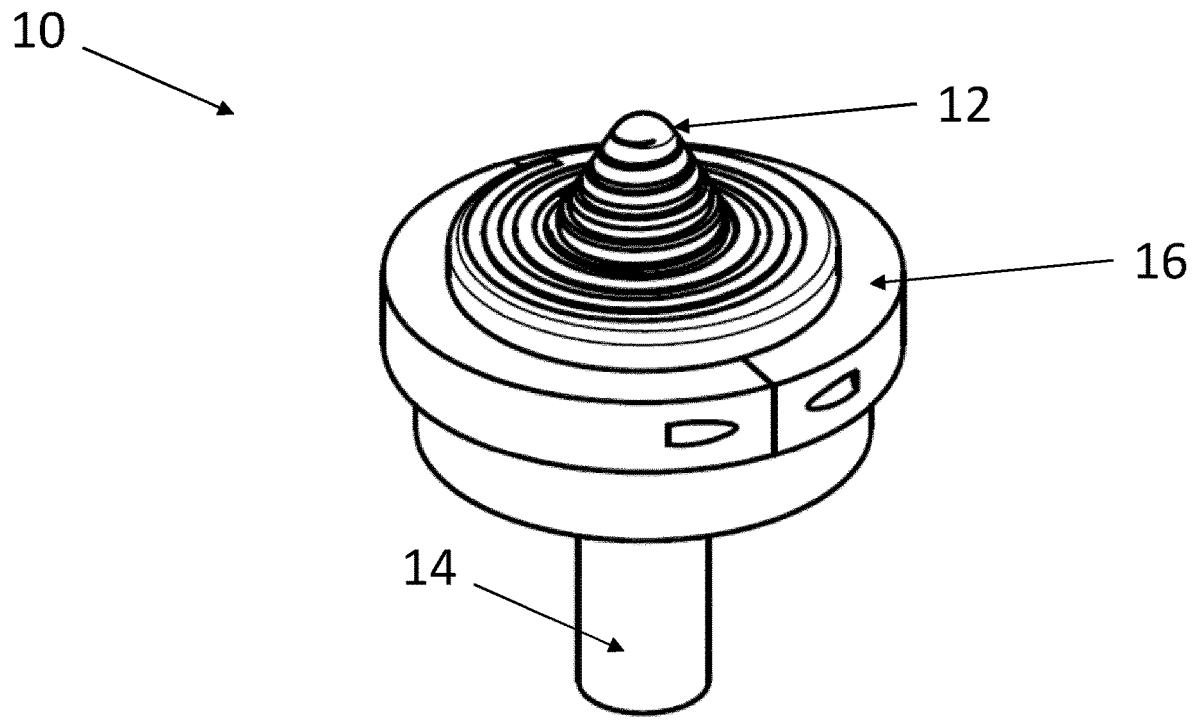
FIG. 1 is a perspective view of a first embodiment of a tool assembly, in an assembled condition.
Figure 2:
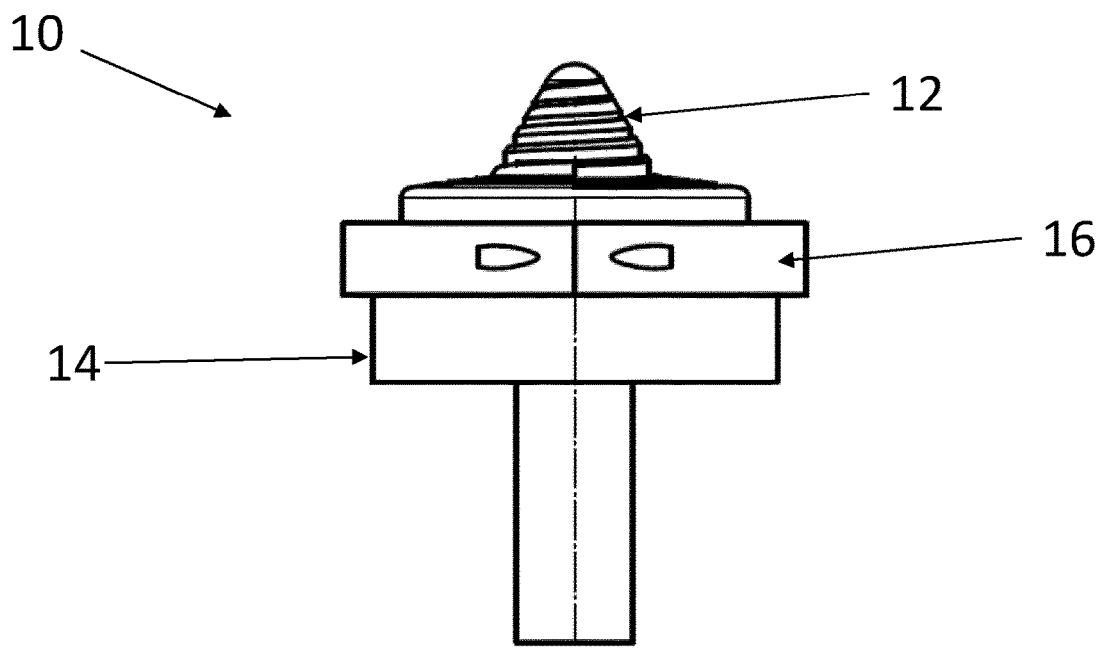
FIG. 2 is a side view of the tool assembly of FIG. 1.
Figure 3:
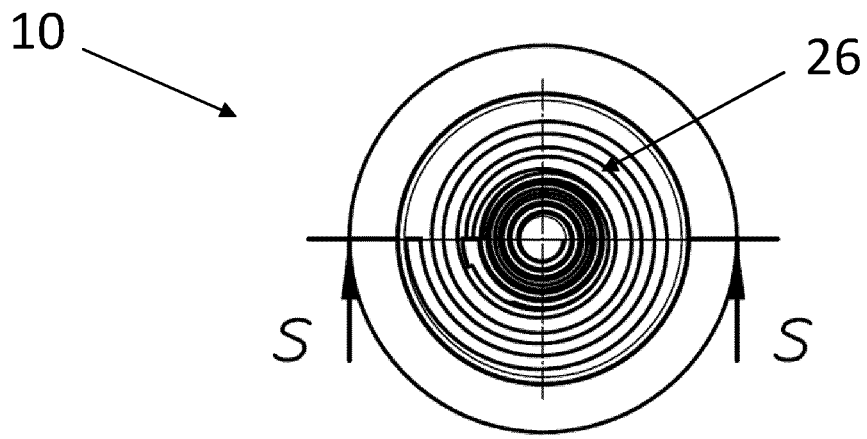
FIG. 3 is a plan view of the tool assembly of FIG. 1.
Figure 4:
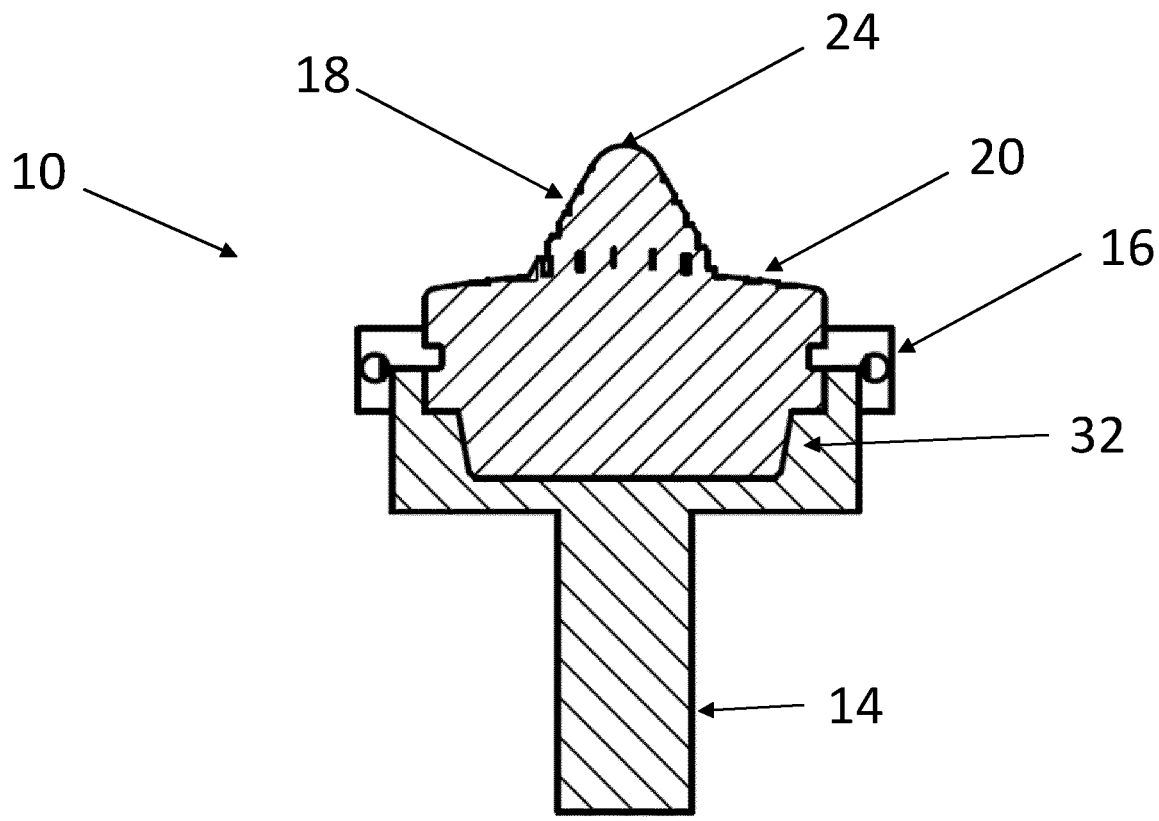
FIG. 4 is a cross-sectional view of the tool assembly of FIG. 3 along the line S-S.

Referring firstly to FIGS. 1 to 4, an embodiment of a tool assembly, in accordance with the invention, is indicated generally at 10. The tool assembly comprises a polycrystalline cubic boron nitride (PCBN) tool insert 12 and a tool holder 14 to hold the PCBN tool insert 12. The tool assembly 10 has a longitudinal axis of rotation (not shown) about which it rotates during use in the friction stir welding process. Note that this axis of rotation is not an axis of rotational symmetry due to an asymmetric thread pattern machined into the tool insert 12. The tool insert 12 and tool holder 14 are aligned coaxially about the axis of rotation.

The tool assembly 10 further comprises a retention mechanism to mechanically lock the tool insert 10 and tool holder 12 together, thereby preventing separation during FSW. This positive locking action is distinct from and vastly superior to the passive shrink fit methods known in the art. It is also distinct from a threaded screw cap arrangement that is sometimes mounted about the tool holder. In this embodiment, the retention mechanism comprises a locking collar 16, described in detail below.

Tool Insert

Turning to FIGS. 10 to 14, the tool insert 12 comprises a stirring pin 18, a shoulder portion 20 and a body portion 22, all in axial alignment with each other, with the shoulder portion 20 essentially being the interface between the stirring pin 18 and the body portion 22. The stirring pin 18, shoulder portion 20 and body portion 22 are all integrally formed with each other such that the tool insert 12 is one-piece. The tool insert 12 is machined out of a single PCBN block after the block has been sintered in a HPHT press.

The stirring pin 18 has a conical profile, tapering outwardly from a rounded apex 24 towards the shoulder portion 20. The stirring pin 18 comprises an inscribed spiral feature 26 running from the apex 24 down towards and onto the shoulder portion 20. The spiral 26 has a planar pathway, which faces axially and the working surface faces radially.

The shoulder portion 20 is disc-like, and has a larger diameter than a circular base of the stirring pin 18. The shoulder portion 20 extends axially downwardly to meet the body portion 22.

The body portion 22 is generally cylindrical.

Advantageously, a circumferentially extending locking groove 28 is provided in an upper region of the body portion 22, proximate the shoulder portion 20, to mechanically engage with the locking collar 16, as part of the retention mechanism. The locking groove 28 extends around the entire circumference of the body portion 22. However, this need not be the case, and alternatively the locking groove 28 may extend only partially around the circumference of the body portion 22, with the locking collar 16 configured accordingly.

In an alternative embodiment, the circumferentially extending groove 28 on the tool insert 12 is replaced by a circumferentially extending flange (not shown). The flange may extend partially around the tool insert 12 or it may extend around the entire tool insert 12. In such an embodiment, the flange cooperates with one more circumferentially extending grooves (not shown) on the locking collar 16.

Figure 5:
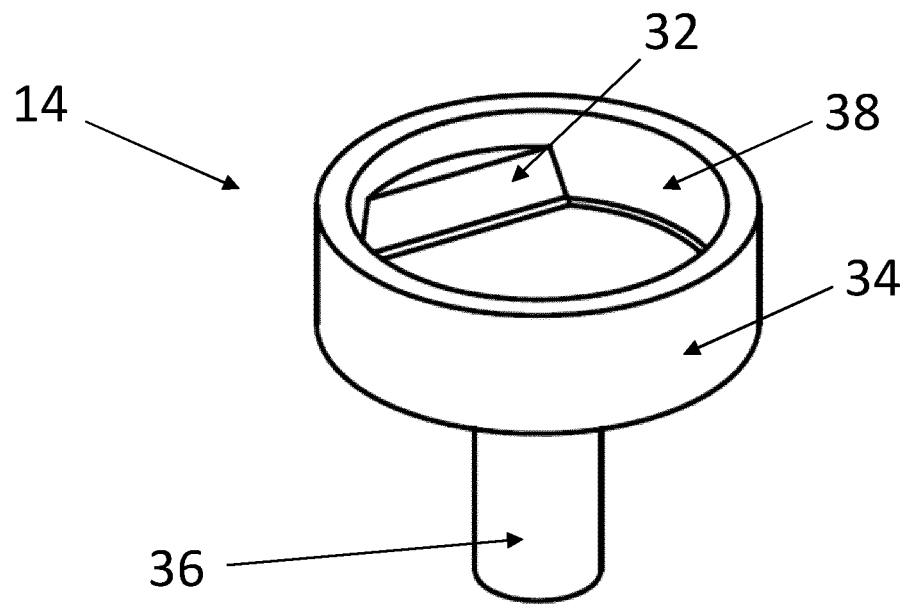
FIG. 5 is a perspective view of the tool holder of FIG. 1.
Figure 11:
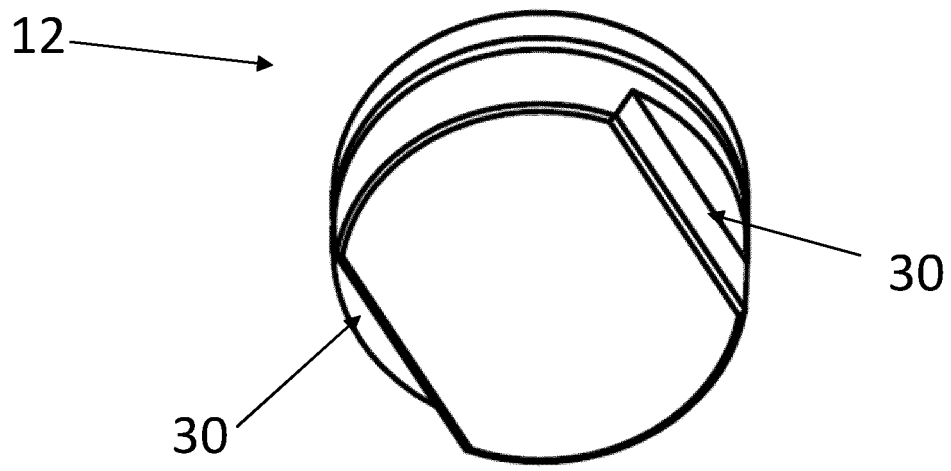
FIG. 11 is a perspective view from below of the tool insert of FIG. 10.
Figure 12:
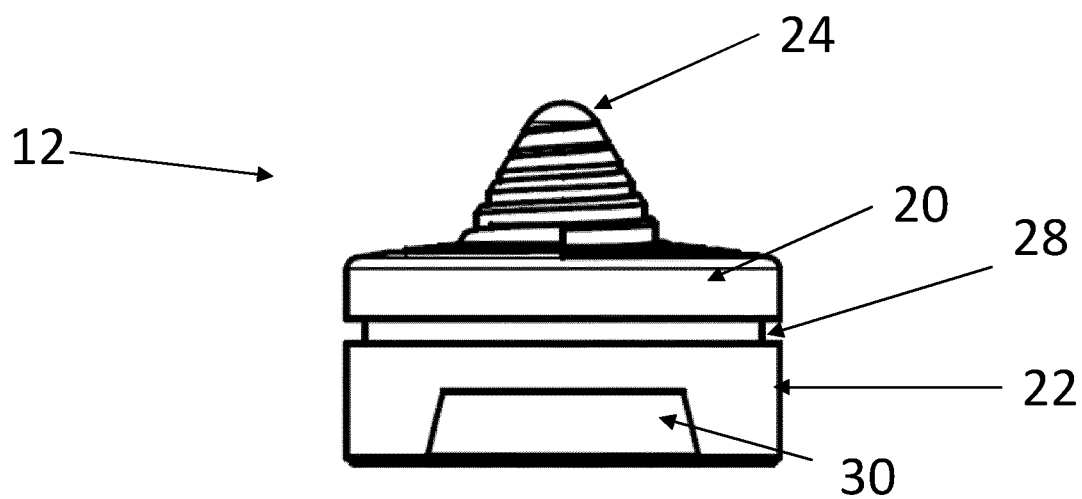
FIG. 12 is a side view of the tool insert of FIG. 10.
Figure 13:
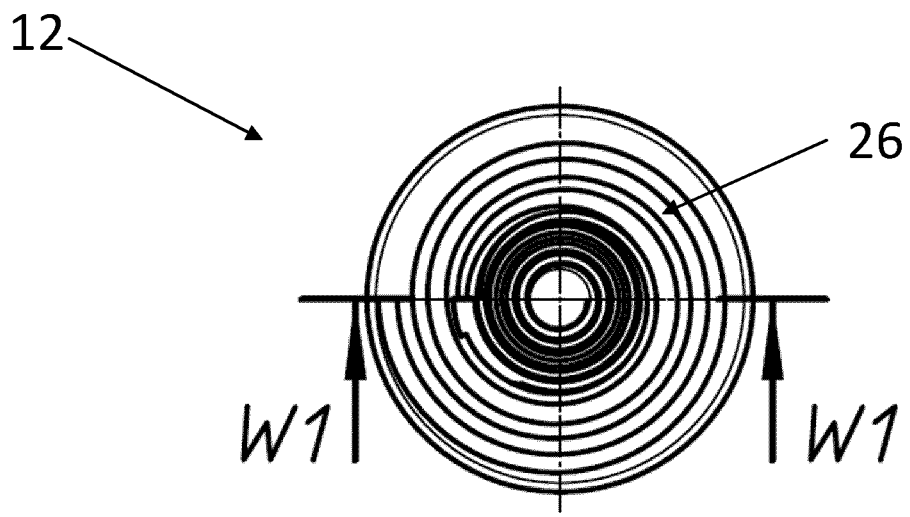
FIG. 13 is a plan view of the tool insert of FIG. 10.
Figure 14:
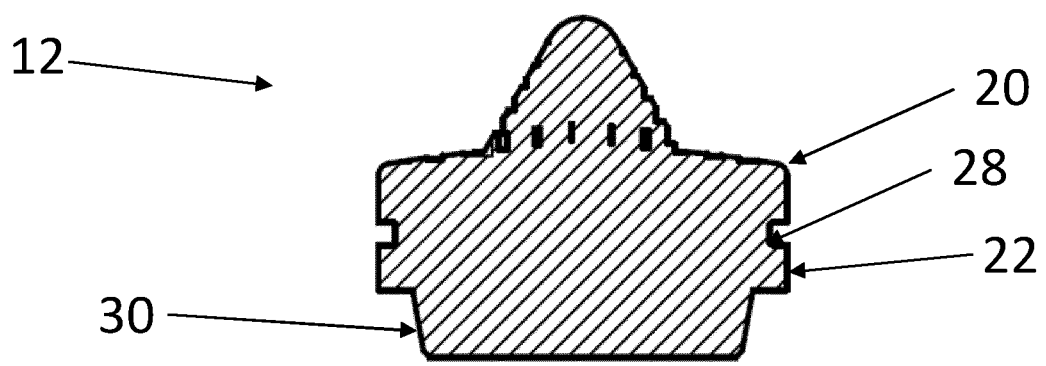
FIG. 14 is a cross-sectional view of the tool insert of FIG. 13 along the line W1-W1.
Figure 15:
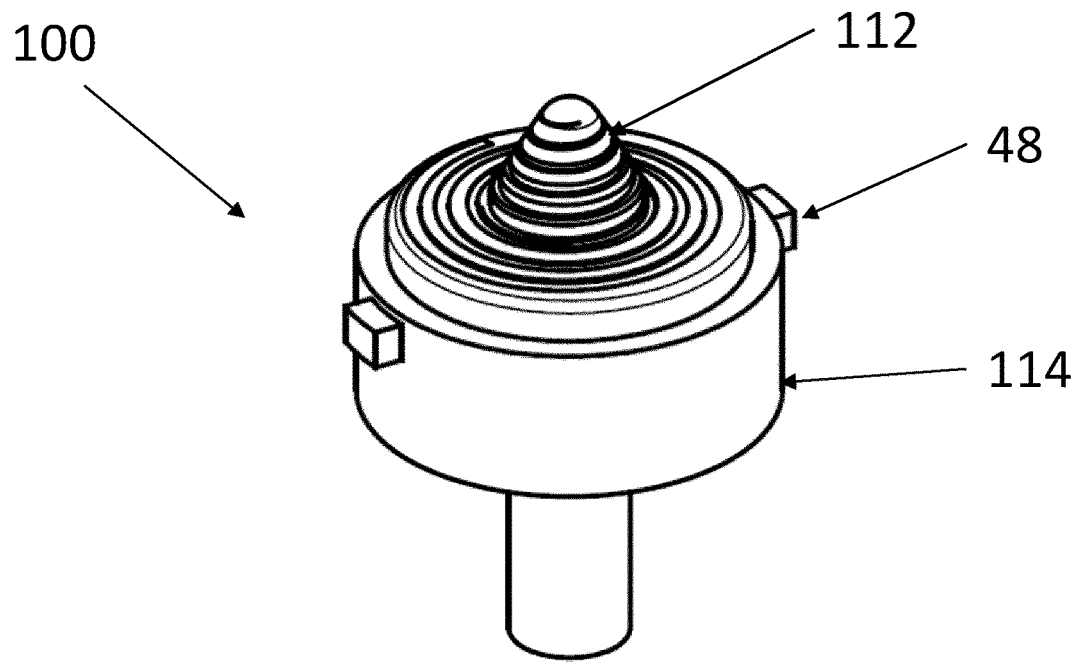
FIG. 15 is a perspective view of a second embodiment of a tool assembly, also in an assembled condition.
Figure 16:
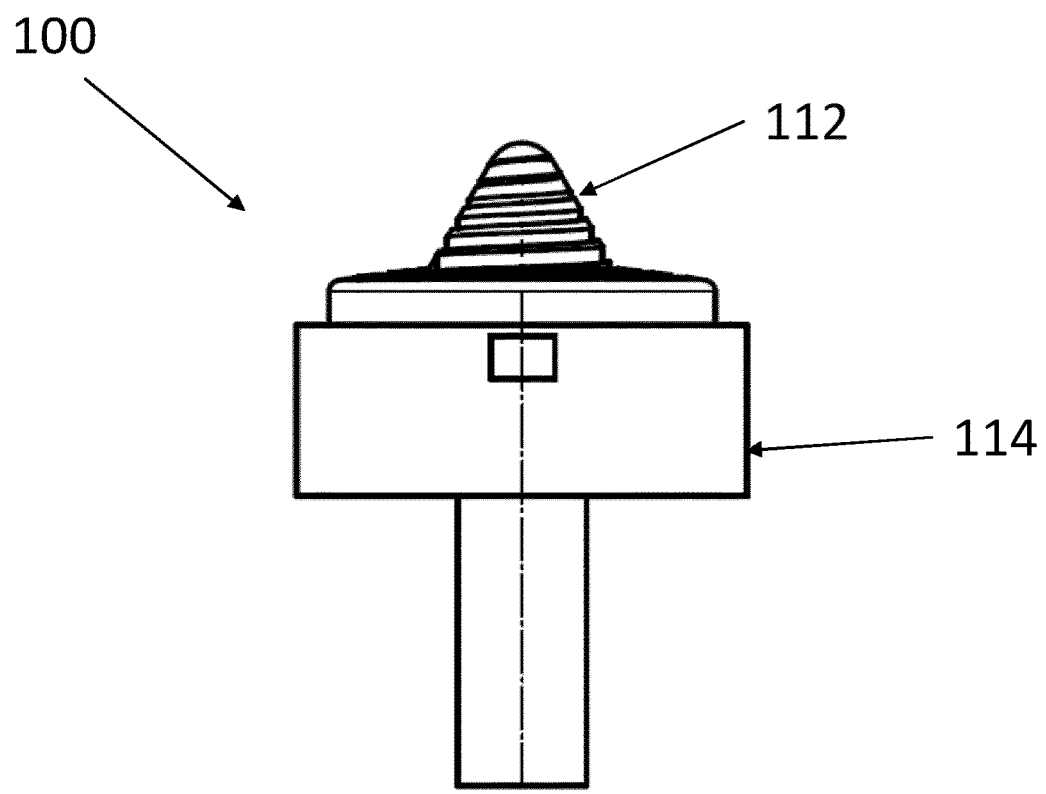
FIG. 16 is a side view of the tool assembly of FIG. 15.
Figure 17:
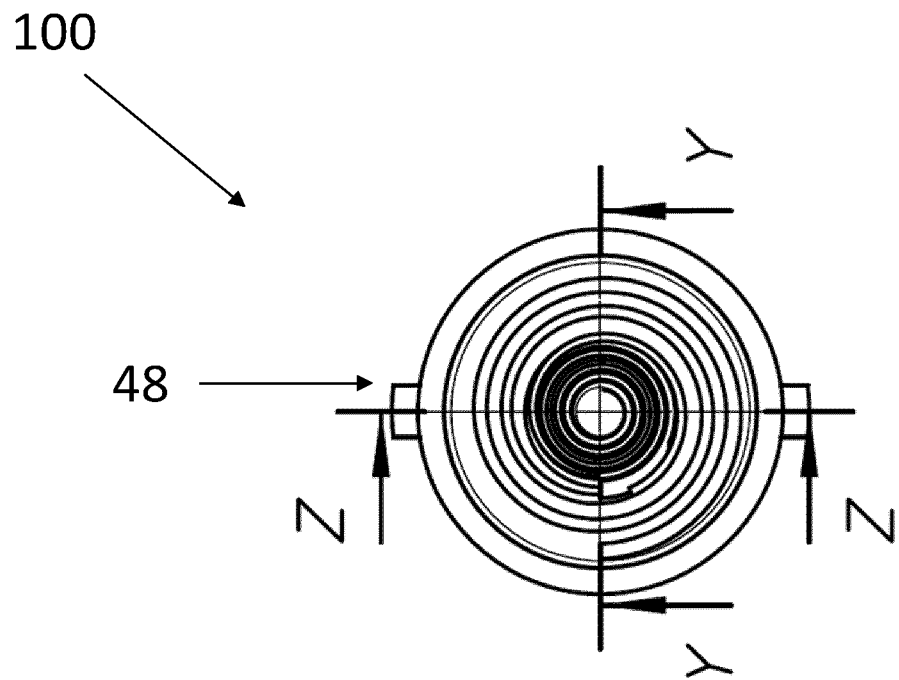
FIG. 17 is a plan view of the tool assembly of FIG. 15.
Figure 18:
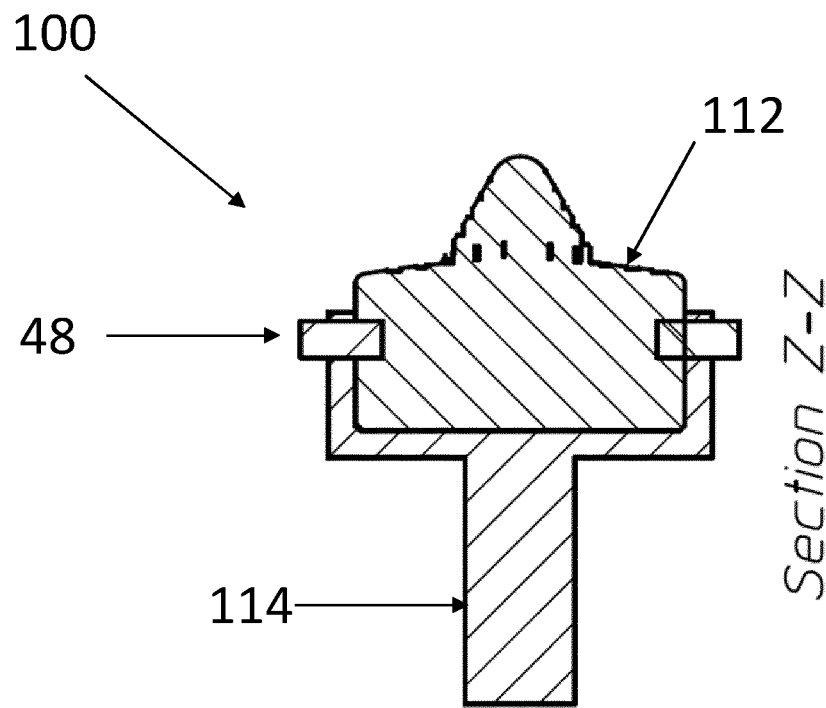
FIG. 18 is a cross-sectional view of the tool assembly of FIG. 17 along the line Z-Z.
Figure 19:
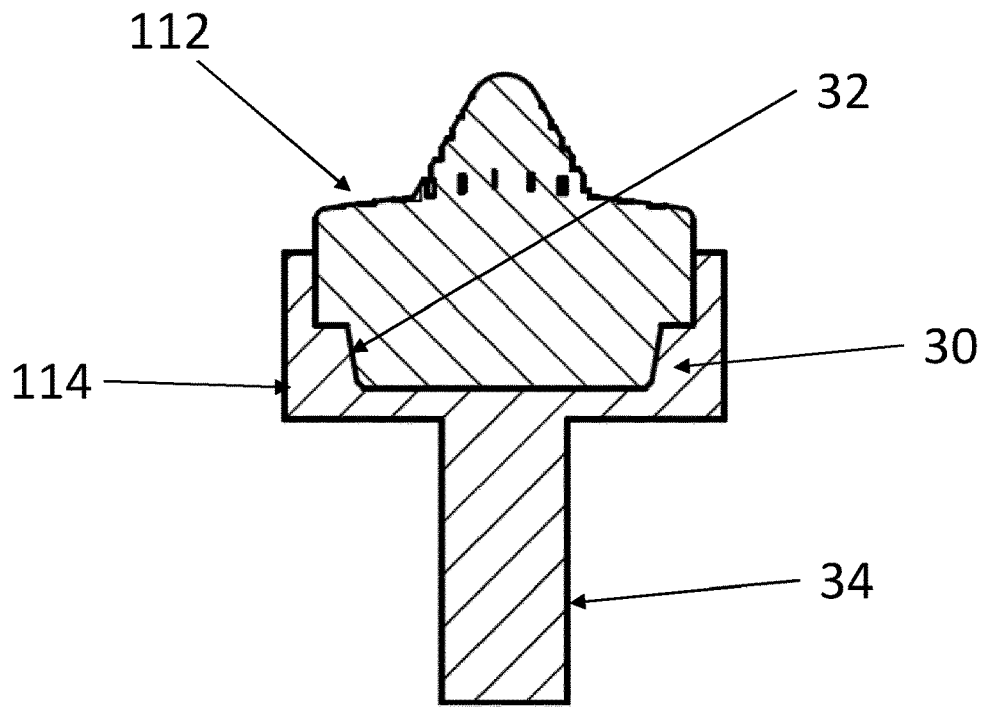
FIG. 19 is a cross-sectional view of the tool assembly of FIG. 17 along the line Y-Y.
Figure 20:
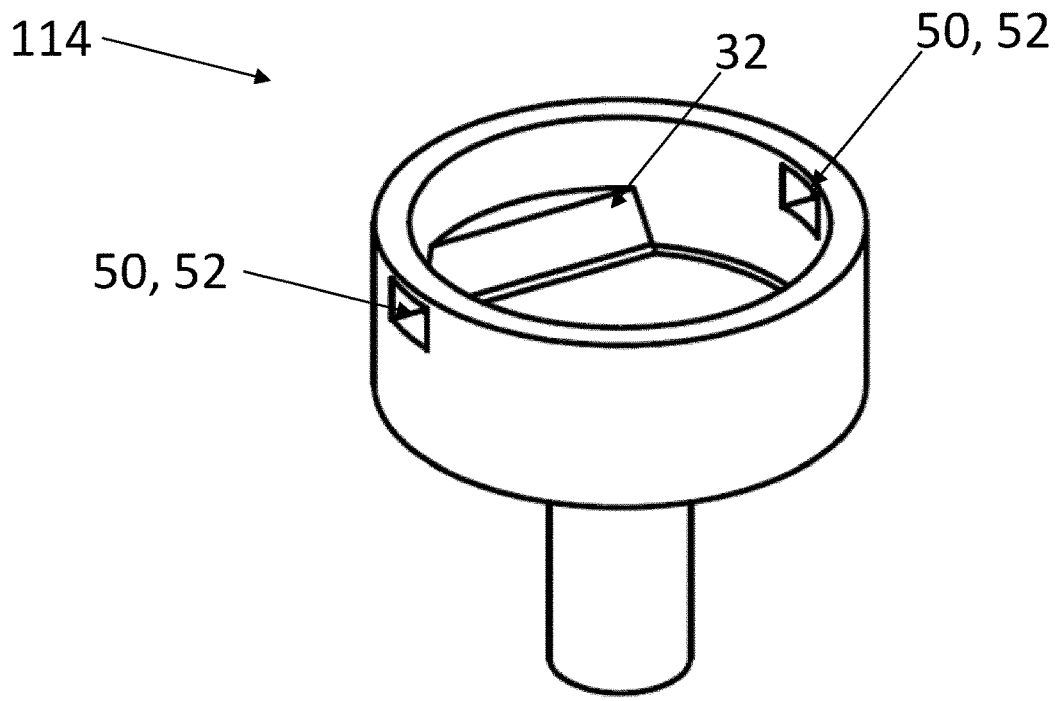
FIG. 20 is a perspective view of the tool holder of FIG. 15.
Figure 21:
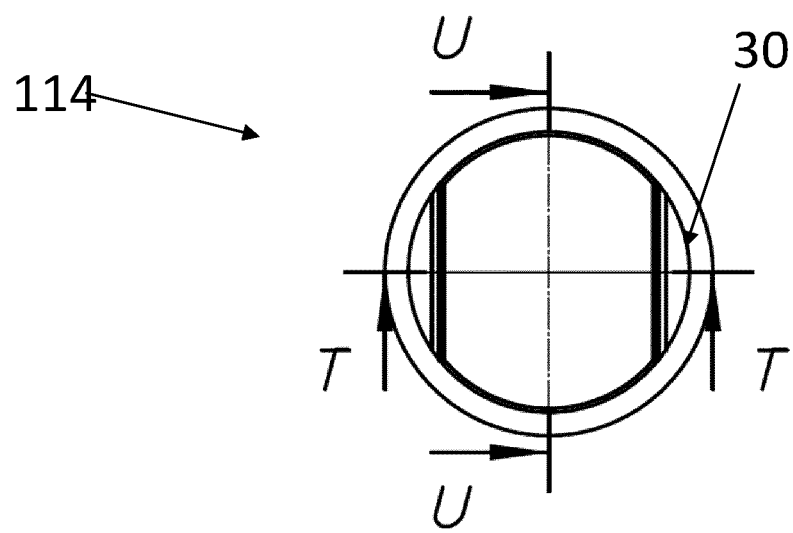
FIG. 21 is a plan view of the tool holder of FIG. 15.

As shown in FIG. 11, two segment shaped slots 30 cut into a lower end of the body portion 22. The segment shaped slots 30 are diametrically opposed to each other. Forming part of an anti-rotation mechanism, the segment shaped slots 30 cooperate with two segment shaped steps 32 (see FIG. 5) within the tool holder 14 when the tool insert 12 is in position and supported by the tool holder 14. The anti-rotation mechanism prevents relative rotational movement between the tool insert 12 and the tool holder 14 about the axis of rotation. Alternative examples of the anti-rotation mechanism are described in more detail later.

In use, rotation of the tool assembly 10 is such that the spiral 26 drives workpiece material flow from the edge of the shoulder portion 20 to the centre and then down the length of the stirring pin 18. This forces workpiece material to circulate within the stirred zone and to fill the void formed by the stirring pin 18 as the tool insert 12 traverses in a known manner.

Tool Holder

Referring to FIGS. 4, 5, 6 and 9, the tool holder 14, comprises a holding member 34 for receiving the tool insert, and an elongate trunk member 36 joined at one end thereof to the holding member 34.

The trunk member 36 is solid and cylindrical. The purpose of the trunk member 36 is to facilitate connection of the tool assembly 10 to the FSW machinery.

The holding member 34 is externally cylindrical and internally comprises a recessed cup 38 to receive the tool insert 12. The recessed cup 38 is located centrally about the axis of rotation.

The recessed cup 38 comprises a lower base surface 40, an upper opening 42 through which the tool insert 12 is inserted, and a sidewall 44 connecting the base surface 40 to the opening 42.

In this embodiment, the sidewall 44 is generally cylindrical and has a constant circular lateral cross-section about its length, intended for use with a tool insert that is at least partially cylindrical.

In an alternative embodiment, the sidewall 44 is generally frusto-conical and has a circular lateral cross-section increasing in diameter away from the base surface 40. This profile of recessed cup 38 is intended for use with a tool insert that is at least partially conical.

The recessed cup 38 sized and shaped to receive only a portion of the body portion 22 such that when together, the tool insert 12 protrudes out of the tool holder 14, with the shoulder portion exposed.

Figure 22:
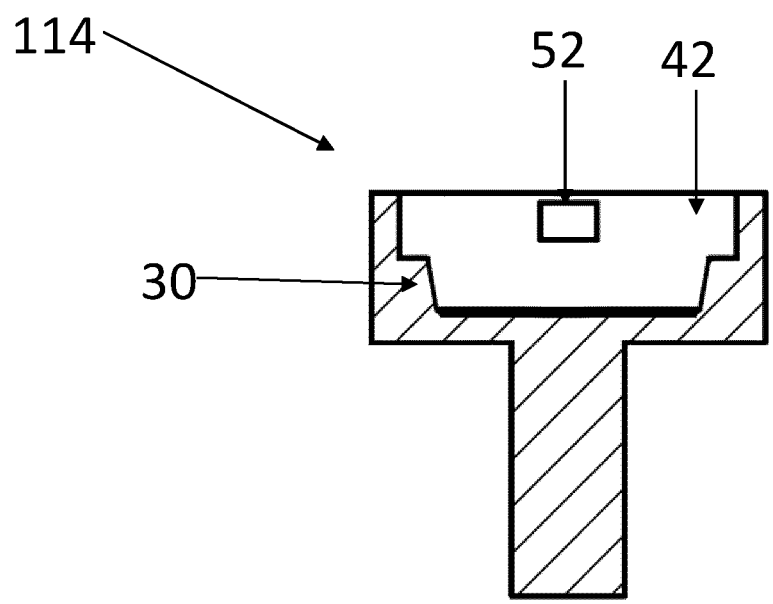
FIG. 22 is a cross-sectional view of the tool holder of FIG. 21 along the line T-T.
Figure 23:
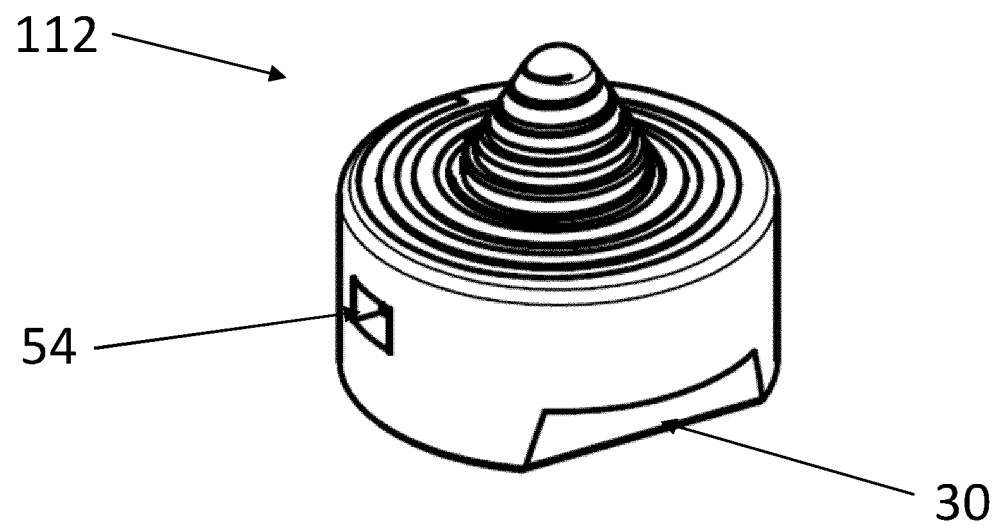
FIG. 23 is a perspective view of the tool insert of FIG. 15.
Figure 24:
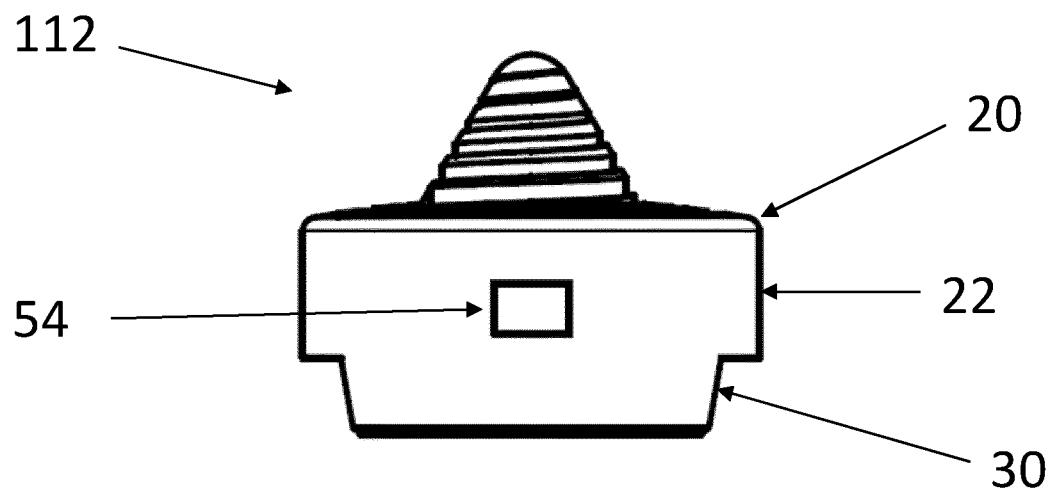
FIG. 24 is a side view of the tool insert of FIG. 23.
Figure 25:
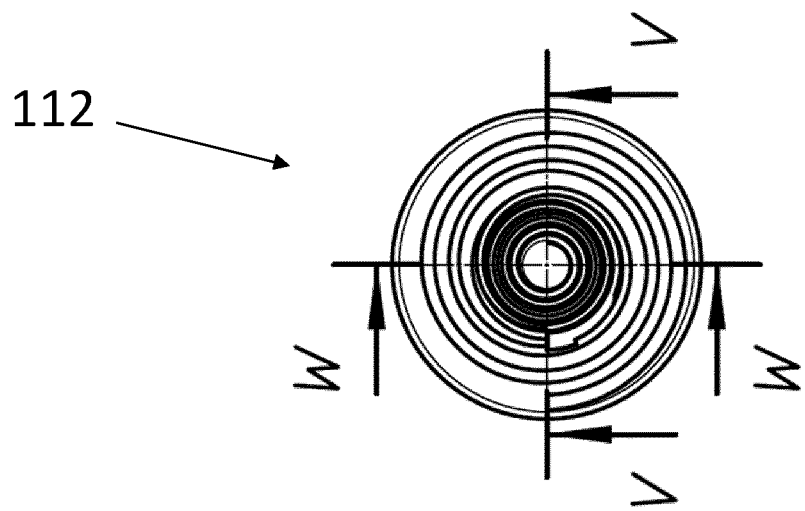
FIG. 25 is a plan view of the tool insert of FIG. 23.
Figure 26:
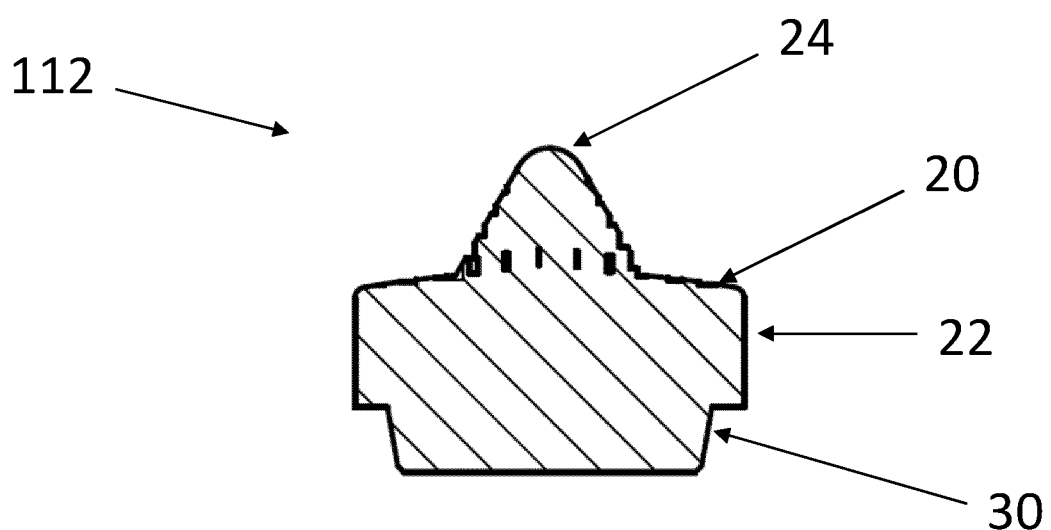
FIG. 26 is a cross-sectional view of the tool insert of FIG. 25 along the line V-V.
Figure 27:
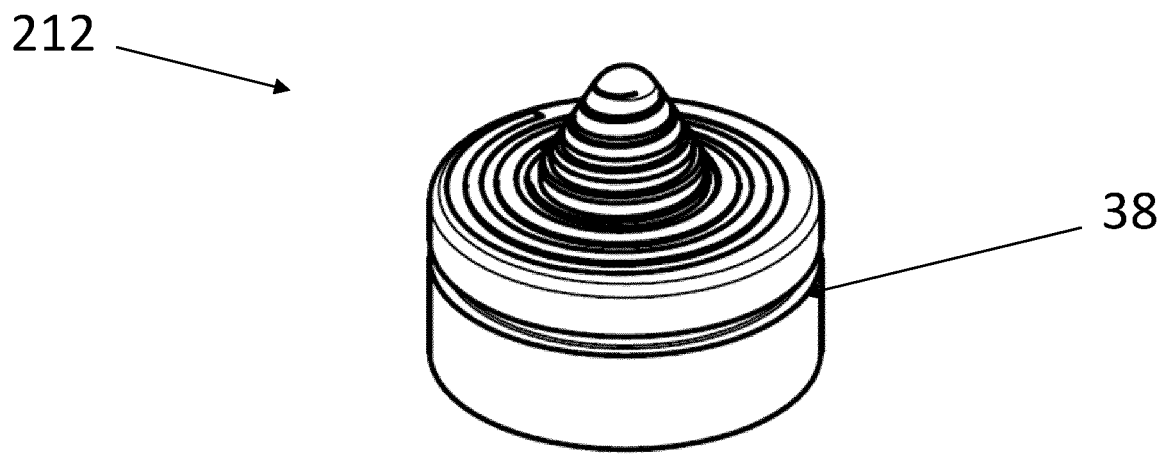
FIG. 27 is a perspective view of a tool insert in a further embodiment.
Figure 28:
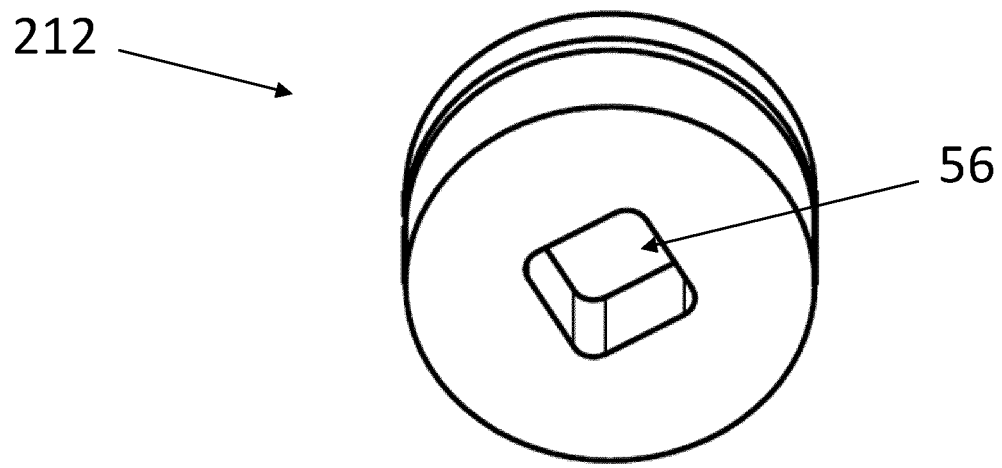
FIG. 28 is a perspective view from below of the tool insert of FIG. 27.
Figure 29:
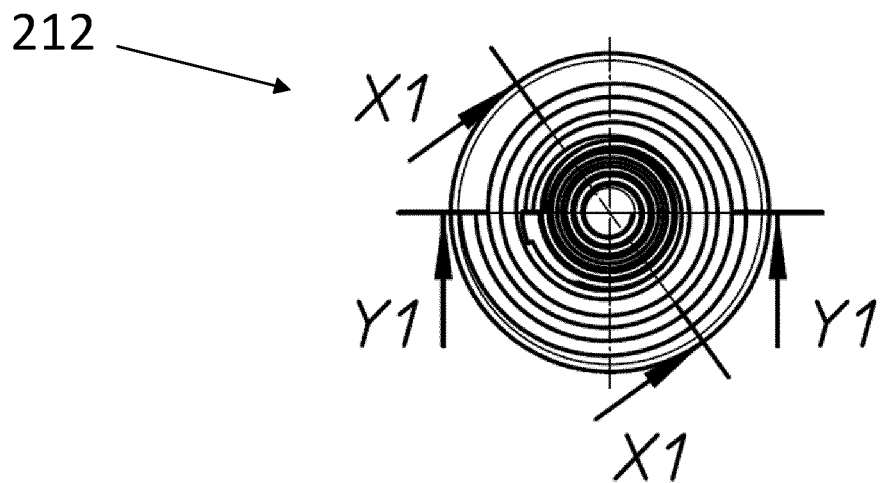
FIG. 29 is a plan view of the tool insert of FIG. 27.
Figure 30:
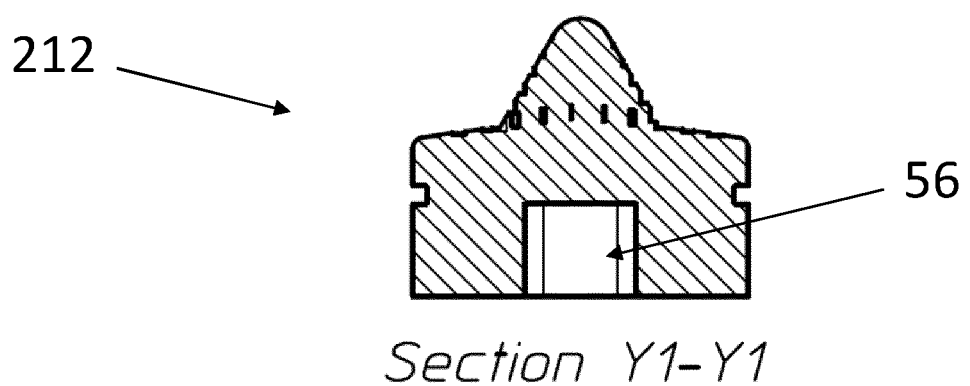
FIG. 30 is a cross-sectional view of the tool insert of FIG. 29 along the line Y1-Y1.

Regardless of whether the internal profile of the recessed cup 38 is conical or cylindrical, two segment shaped steps 32 are built into the sidewall 44. The sidewall 44 is therefore stepped in longitudinal cross-section, as shown in FIG. 22. The segment shaped steps 32 form part of the anti-rotation mechanism introduced earlier. When the tool insert 12 is in position inside the recessed cup 38, the segment shaped steps 32 abut against the segment shaped slots 30 of the tool insert 12, precluding rotation of the tool insert 12 relative to the tool holder 14. It is important to avoid rotation as this is one way in which the tool insert 12 can gradually become loose and detach from the tool holder 14.

Retention Mechanism

Figure 7:
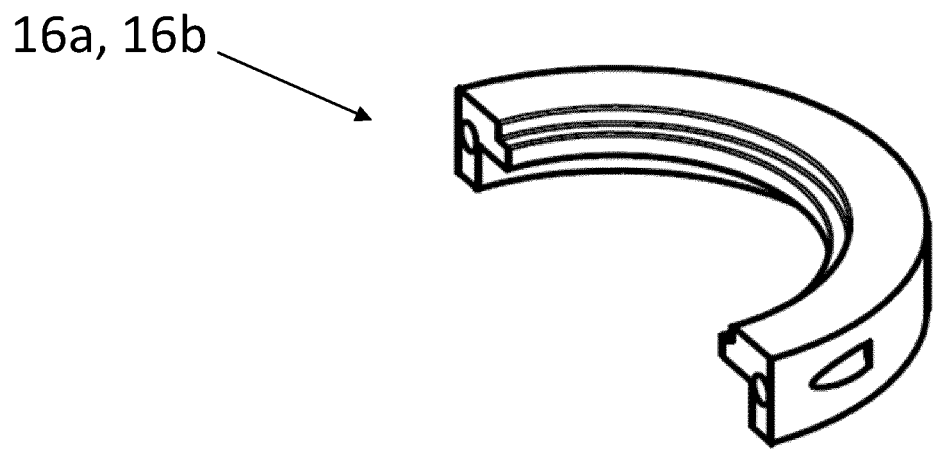
FIG. 7 is a perspective view of a portion of the locking collar of FIG. 6.
Figure 8:
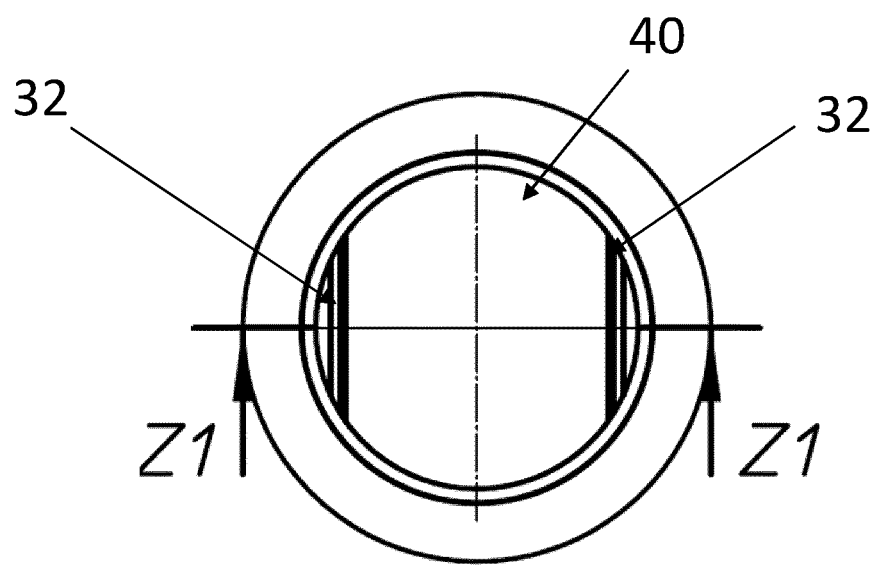
FIG. 8 is a plan view of the tool holder and locking collar portion of FIG. 6.
Figure 9:
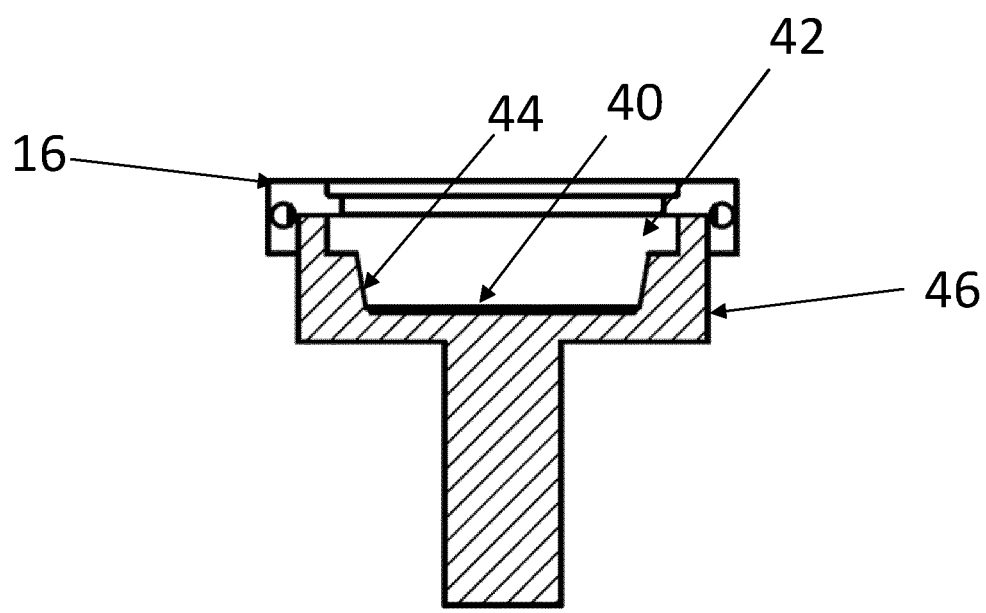
FIG. 9 is a cross-sectional view of the tool holder of FIG. 8 along the line Z1-Z1.
Figure 10:
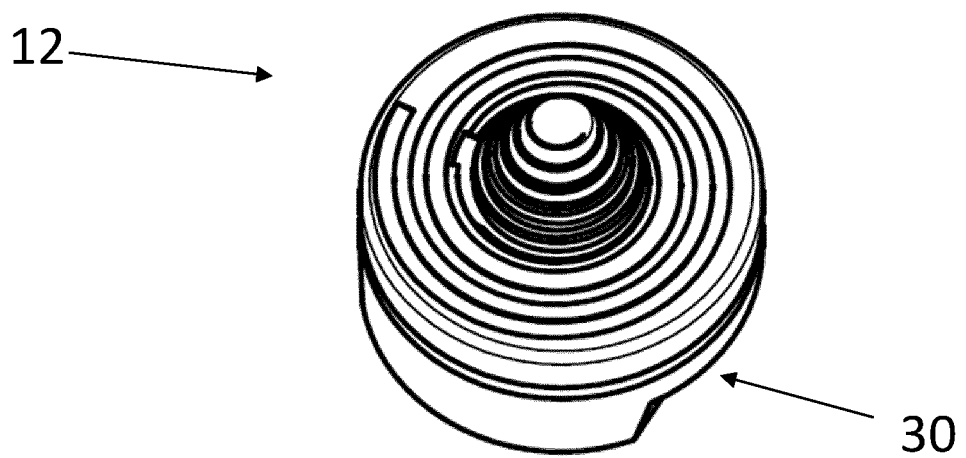
FIG. 10 is a perspective view of the tool insert of FIG. 1.

As mentioned above, the retention mechanism comprises the locking collar 16 (FIG. 7) and the circumferentially extending groove 28 on the tool insert 12. Optionally, the retention mechanism also comprises a high temperature seal located underneath the locking collar 16.

Figure 6:
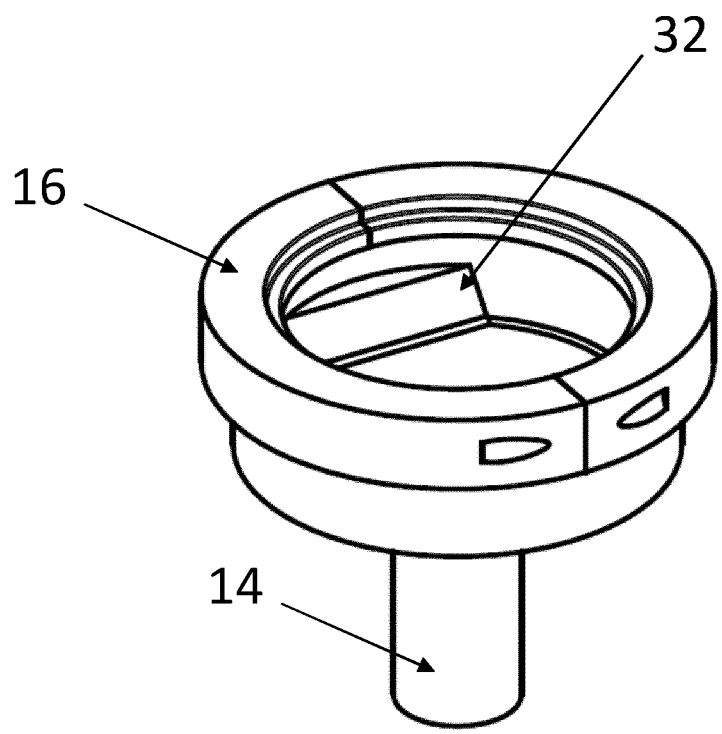
FIG. 6 is a perspective view of the tool holder of FIG. 5 with a locking collar, the tool insert having been omitted for clarity.

As shown in FIGS. 1 and 6, the locking collar 16 comprises two arcuate collar portions 16a, 16b although more could be used instead. Preferably, the arcuate collar portions 16a, 16b are equally sized in length. Essentially, the arcuate collar portions 16a, 16b are adapted to connect securely end-to-end together to form a single ring. Providing the locking collar 16 in arcuate collar portions 16a, 16b enables close fitment about the tool insert 12 and/or tool holder 14 but without compression.

The locking collar 16 is annular, with an L-shaped lateral cross-section. When the tool insert 12 is in-situ, supported by the tool holder 14, the locking collar 16 extends around the opening 42 of the tool holder, against a rim thereof. The locking collar 16 is also mounted against the external surface 46 of the holding member 34. The locking collar 16 extends into the circumferentially extending groove 28 on the tool insert 12 in mating engagement. When connected securely together, the arcuate collar portions 16a, 16b retain the tool insert 12 in place securely held in the tool holder 14, stopping the tool insert 12 from disengaging from the tool holder 14.

Referring to FIGS. 15 to 26, an alternative embodiment of the tool assembly is indicated generally at 100. The tool assembly 100 comprises a further embodiment of the tool insert 112 and a further embodiment of the tool holder 114.

In this embodiment, the retention mechanism comprises a locking pin 48 that couples with a locking aperture 50 in the tool insert 112 and/or the tool holder 114. In a preferred embodiment, the retention mechanism comprises two or more locking pins 48. The two locking pins 48 are diametrically opposed to each other. Preferably, the locking pins 48 are manufactured from soft steel to minimise stress. In an embodiment, the locking apertures 50 comprise radially extending through-holes 52, arranged through the tool holder 114, and radially extending blind-holes 54 arranged in the tool insert 112, which are aligned with the through-holes 52 of the tool holder 114.

FIGS. 27 to 30 show an alternative example of the anti-rotation mechanism in a further embodiment of the tool insert, indicated at 212. The anti-rotation member comprises a square shaped boss on an underside of the tool holder and a correspondingly shaped recess 56 on the tool insert 112. As another example, the square shaped boss could be located on the tool insert and the square shaped recess on the base surface 40 of the tool holder 114.

Tool Holder Materials

Another aspect of the retention mechanism, supplementary to the mechanical solutions described above, is the tool holder material. The holding member 34 and trunk member 36 are preferably integrally formed with each other, making the tool holder 14 a single component. However, they may be manufactured as two separate components, comprising or consisting of two different materials, and joined subsequently together.

The tool holder 12 comprises a high temperature high strength alloy. For example, the tool holder 12 may comprise any one or more of the following materials: NIMONIC® 80A, Inconel alloys (a class of nickel-chrome based super alloys), W—Ni (tungsten-nickel) alloy, TZM (molybdenum-titanium-zirconium), high entropy alloys. In general, these alloys are characterised by good strength at elevated temperatures.

Testing carried out with a tool holder 14 comprising NIMONIC® 80A and Al4Nb4 HEA, a high entropy alloy, resulted in superior tool insert 12 retention in the tool holder 14. Without wishing to be bound by theory, it is thought that as the temperature increases during the initial stage of FSW, the alloys soften, allowing the tool insert 12 to indent the tool holder 14 to a depth of 10 to 50 micron. Once the plunge stage is complete, precipitation hardening then occurs due to thermal cycling, hardening the alloy and surprisingly gripping the tool insert 12 in place.

In some materials, rather than precipitation hardening, alternative or additional hardening mechanisms such as strain hardening and/or phase change are triggered. These intentionally occur during the FSW process, at elevated temperatures and whilst the tool holder is under load. The effect of the hardening mechanism is capitalised so as to retain the tool insert within the tool holder.

Brazing and Materials

Figure 31:
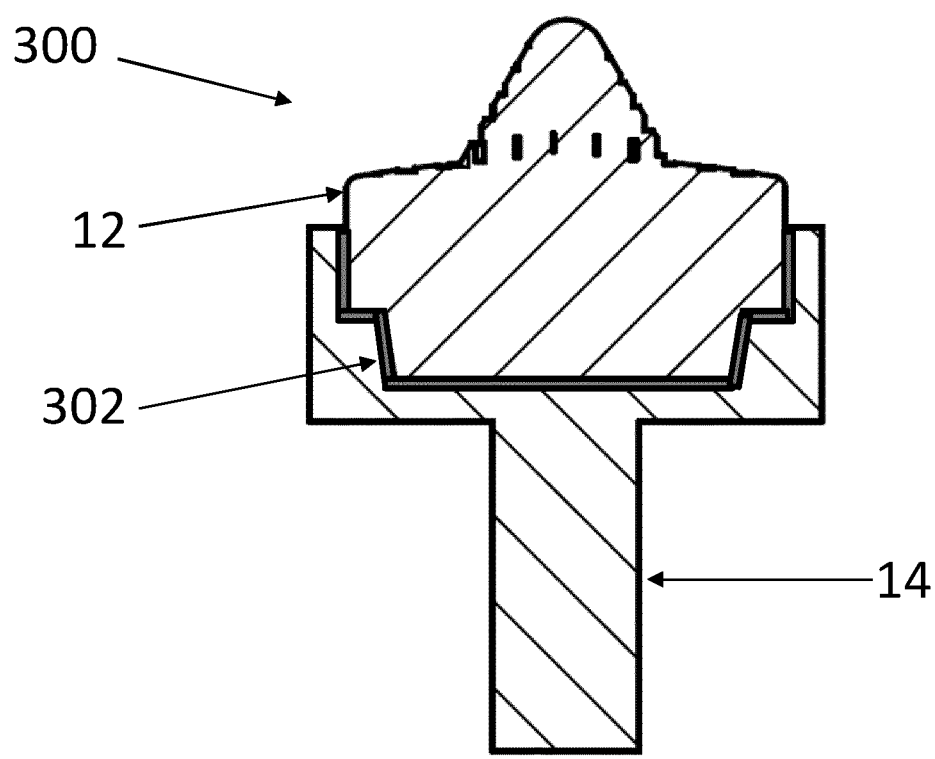
FIG. 31 is a cross-sectional view of a tool assembly in an embodiment of the invention, showing in particular a layer of braze between the tool insert and the tool holder.

In a further embodiment, the tool assembly 300 further comprises a braze layer 302 intermediate the tool insert 12 and the tool holder 14—see FIG. 31. The braze layer 302 chemically bonds to the tool insert 12 and the tool holder 14, thereby forming a strong joint between them. The brazing 302 provides enough strength for the tool not to fall during plunging. The heat subsequently created due to friction deforms the tool holder 14 and the tool insert 12 embeds into the tool holder 14 via the hardening mechanism described above.

Preferably, the braze layer 302 comprises a palladium based alloy, e.g. a suitably selected Pallabraze™ filler metal from Johnson Matthey™. Such alloys exhibit good resistance to oxidation and strength at elevated temperatures. Appropriately selected, the palladium based alloy has a melting temperature greater than 950° C. and has high shear strength at high temperatures.

Alternative braze materials that are suitable for the application include: Active Brazing Alloys (ABA®) from Johnson Matthey™, Ticusil® from Morgan Advanced Materials™, and NiCrInMn alloys.

During assembly, brazing is carried out at high temperature and under high vacuum, where the pressure is $>10^{-5}$ bar.

The inventors have unexpectedly found brazing to be an enabling technology for welding steel plates that are thicker than 12 mm. The hitherto limiting factor for welding thicker plates is stirring pin 18 length, and consequently, the overall size of the PCBN tool insert 12. With the prior art design of tool inserts, the manufacture of larger PCBN blocks (also known as 'cylinders') to accommodate tool inserts with larger pin heights is prohibitively challenging due to restrictions on the HPHT press die bore length, as well as inhomogeneous pressure distributions resulting from taller HPHT capsules. To increase the height of the stirring pin 18 without resorting to pressing longer cylinders, presents a significant advantage in manufacture.

If using filler metals to attach the tool insert to the tool holder, the overall height of the tool insert can be significantly shortened since the large surface area required for shrink fitting the tool insert into place is no longer required. Advantageously, it also means that the commonly used threaded screw cap mounted about the tool holder may be omitted, thereby bringing a cost benefit.

Figure 32:
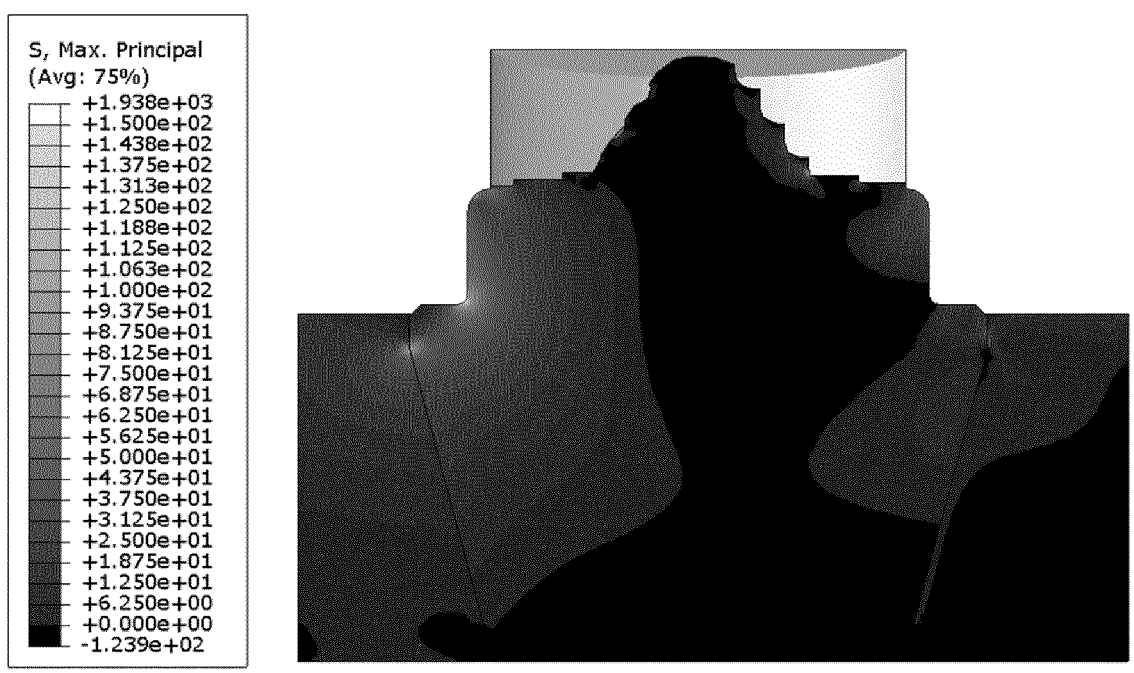
FIG. 32 is an image taken from Finite Element Analysis of a prior art design, indicating the maximum principle stresses incurred within the tool insert and tool assembly for comparative purposes with FIG. 33.
Figure 33:
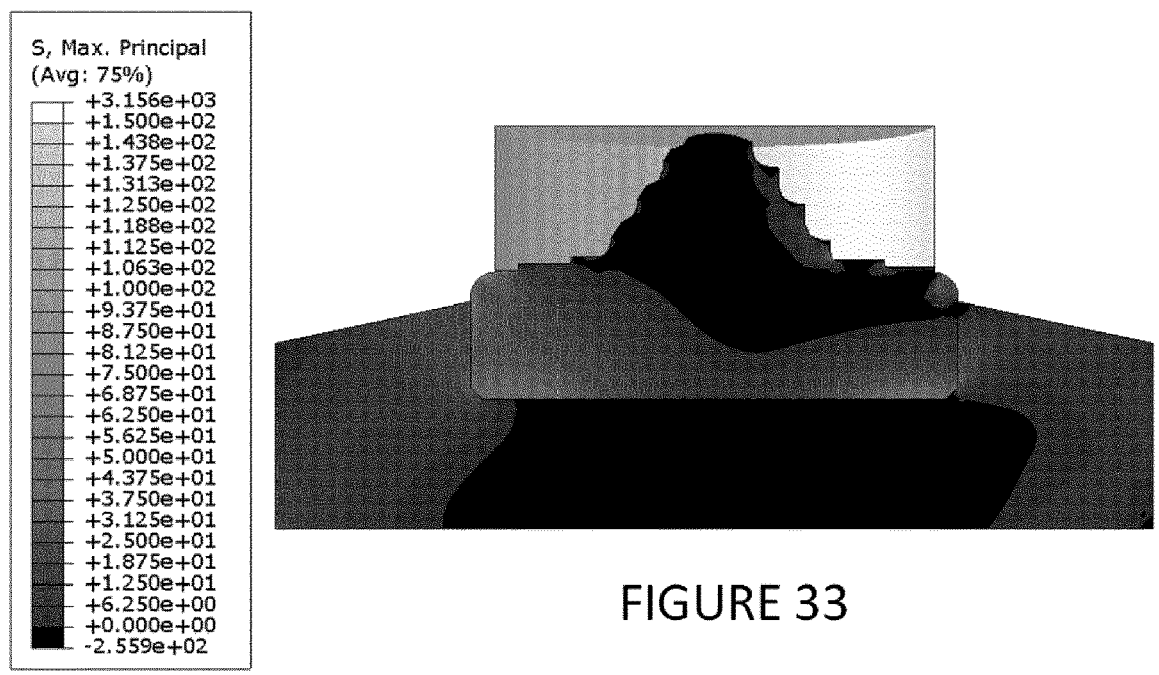
FIG. 33 is an image taken from Finite Element Analysis of a brazed design, indicating the maximum principle stresses incurred within the tool insert and tool assembly for comparative purposes with FIG. 32.

With a shorter tool insert 12, the peak stresses in the tool insert that usually result in failure are also significantly reduced compared with an existing design—FIG. 32. Finite Element Analysis modelling indicates that despite average stresses being higher in the brazed design, peak stresses in the brazed design are around 50% lower than the existing design—see FIG. 33.

It is envisaged that instead of using braze to bond the tool insert and the tool holder, a high temperature glue and other similar adhesives could be used instead. Equally, mechanical bonding is also feasible.

Cooling System

Figure 34:
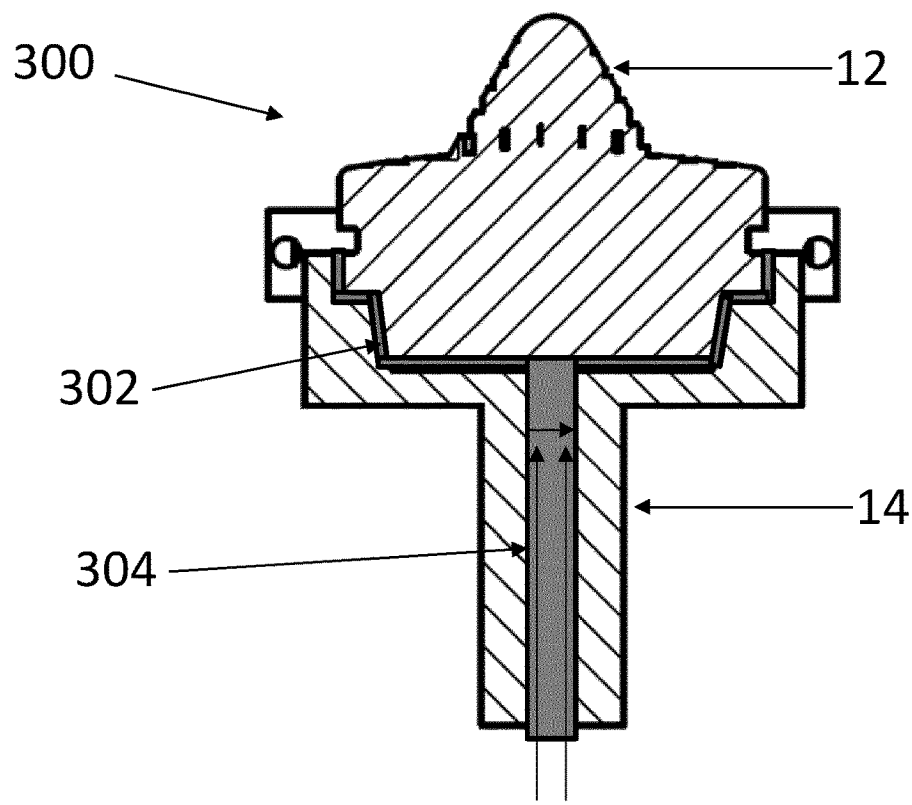
FIG. 34 is a cross-sectional view of a tool assembly in a further embodiment of the invention, showing in particular a cooling system adjacent in a region of braze.

As shown in FIG. 34, the tool assembly 300 may comprises a cooling system 304. The cooling system 304 protects the braze joint. Optionally, the cooling system 304 comprises a network of conduits to carry coolant, such as water. Optionally, the cooling system 304 may comprise a single conduit, for example, arranged in a snaking pattern. Preferably, the cooling system 304 is adapted to maintain the temperature in the braze region at a temperature of less than 150° C.

Ideally, the conduits are arranged in or proximate to the base surface 40 of the tool holder 14. Coverage of the cooling system 304 may also extend up the sidewall 44 of the recessed cup 38. Alternatively, the cooling system 304 may be arranged in or behind the sidewall 44 and not the base surface 40, though this arrangement is less effective.

In this way, the cooling system 304 is able to transfer away heat generated during FSW that is experienced at the stirring pin 18 and the shoulder portion 20, and which has been conducted through the body portion 22 of the tool insert 12. By reducing the temperature in the braze region between the tool insert 12 and tool holder 14, the joint is shielded from higher temperatures, minimising the otherwise deleterious effect on braze strength. This facilitates retention of the tool insert 12 in the tool holder 14.

While this invention has been particularly shown and described with reference to embodiments, it will be understood by those skilled in the art that various changes in form and detail may be made without departing from the scope of the invention as defined by the appended claims.

For example, for the anti-rotation mechanism, it is envisaged that only one set of segment slot and step could be used instead of the two sets described above. Equally, three or more sets of segment slots and steps could be provided instead.

The mechanical type retention mechanism may be used in conjunction with any one or more of the following elements: a braze layer, specified tool holder materials (i.e. the high temperature high strength alloys) and/or a cooling system. However, any one of these elements brings its own benefits. Therefore, they may be implemented individually, or in combination with any one or more of the other elements in the list.

The invention claimed is:

1. A friction stir welding (FSW) tool assembly having a longitudinal axis of rotation about which it rotates during use, the tool assembly comprising a tool insert and a tool holder, wherein the tool holder comprises a holding member to coaxially hold the tool insert and an elongate trunk member joined at one end thereof to the holding member, wherein the holding member is externally cylindrical and the trunk member is cylindrical, and wherein the diameter of the holding member is greater than the diameter of the trunk member, the tool insert comprising polycrystalline cubic boron nitride (PCBN), the tool holder holding member comprising a recessed cup into which the tool insert is at least partially received, the tool assembly further comprising a bonding layer to bond the tool insert and the tool holder together, wherein the bonding layer is a layer of braze with a melting temperature of at least 900° C. provided in the recessed cup, wherein the recessed cup comprises a base surface, an opening through which the tool insert is inserted, and a sidewall connecting the base surface to the opening, wherein the sidewall is stepped in longitudinal cross-section, wherein the stepped sidewall comprises at least two segment shaped steps, and wherein the tool insert comprises at least two corresponding segment shaped slots, and wherein, when the tool insert is in position inside the recessed cup, the two segment shaped steps abut against the two corresponding segment shaped slots.

2. A tool assembly as claimed in claim 1, wherein the recessed cup comprises a base surface, an opening through which the tool insert is inserted, and a sidewall connecting the base surface to the opening.

3. A tool assembly as claimed in claim 2, wherein the bonding layer is arranged on the base surface.

4. A tool assembly as claimed in claim 2, wherein the bonding layer is arranged on the sidewall.

5. A tool assembly as claimed in claim 1, wherein the braze layer takes the form of a disc.

6. A tool assembly as claimed in claim 1, wherein the braze layer takes the form of an annulus.

7. A tool assembly as claimed in claim 1, further comprising a cooling system.

8. A tool assembly as claimed in claim 7, wherein the cooling system is positioned adjacent to or proximate a base surface of the tool holder.

9. A tool assembly as claimed in claim 7, wherein the cooling system is positioned adjacent to or proximate a sidewall of the tool holder.

10. A tool assembly as claimed in claim 7, wherein the cooling system comprises a network of conduits.

11. A tool assembly as claimed in claim 7, wherein the cooling system comprises a single conduit arranged in a snaking pattern.

12. A tool assembly as claimed in claim 1, wherein the tool insert comprises W—Re.

* * * * *